Patented June 10, 1947

2,421,862

UNITED STATES PATENT OFFICE 2,421,862

PROCESS FOR PRODUCING POLYHYDRIC ALCOHOLS

Erving Arundale, Colonia, and Louis A. Mikeska, Westfield, N. J., assignors to Standard Oil Development Company, a corporation of Delaware No Drawing. Application December 31, 1940, Serial No. 372,494

3 Claims. (Cl. 260—635)

The present invention relates to a method for the conversion of cyclic acetals to the corresponding polyhydric alcohols. When treated under the reaction conditions described below, cyclic acetals, such as meta dioxanes or dioxolanes of formaldehyde and acetaldehyde, are converted into polyhydric alcohols. One of the difficulties heretofore encountered in carrying out such hydrolysis reactions is that, unless some provision is made for removing one of the reaction products, an equilibrium is set up which prevents the reaction from going to completion. Also, in such reactions, an aldehyde is formed during the conversion of the cyclic acetal, and normally, this aldehyde condenses with itself or with some of the other desirable substances present to yield aldehyde condensation products from which the aldehyde cannot be readily recovered.

The primary object of this invention is to provide a method whereby the aldehyde formed during the conversion of the cyclic acetal is continually removed from the reaction zone in the form of a compound from which it can readily be regenerated for reuse. The continuous removal of the aldehyde condensation products disturbs the equilibrium and this enables the reaction to go to completion. Other and further objects will be apparent in the following specification.

According to the present invention, cyclic acetals and substituted derivatives thereof are converted, by treatment with such compounds as mono- or polyhydric alcohols, mercaptans, chlorohydrins, glycol ethers, amino alcohols, compounds capable of yielding alcohols under the reaction conditions, e. g., esters, into the corresponding polyhydric alcohols. It is preferred to use primary and secondary alcohols and mercaptans and polyhydric alcohols as the compounds capable of reacting with aldehydes liberated during the conversion of the cyclic acetals. The cyclic acetals of formaldehyde and acetaldehyde have been found to be particularly suitable for treatment according to the process of this invention. Examples of these cyclic acetals are the meta-dioxanes, which are cyclic acetals containing a six-membered ring, and dioxolanes, which are cyclic acetals containing a five-membered ring. The reactions of the present invention are carried out at elevated temperatures and at atmospheric or reduced pressure. The reactions may be carried out in the presence or absence of catalysts, but the use of a catalyst results in an increased reaction rate.

The process of this invention is based upon the discovery that, when cyclic acetals are treated with certain compounds capable of reacting with an aldehyde, the cyclic acetals are converted into the corresponding polyhydric alcohols in good yields. The compounds added to react with the aldehyde liberated during the conversion of a cyclic acetal must be chosen so that the acetal formed therefrom has a lower boiling point than that of the cyclic acetal undergoing conversion, so that said newly formed acetal can be fractionated from the reaction mixture continuously. Also, it has been found desirable to use substances capable of reacting with the liberated aldehyde whose acetals have boiling points below 90° C. at atmospheric or reduced pressures. This temperature limitation is particularly applicable to cyclic acetals in whose ring structure is a tertiary carbon atom attached to one of the oxygen atoms. When cyclic acetals containing primary or secondary carbon atoms attached to ring oxygen atoms are treated according to this invention, compounds capable of reacting with the liberated aldehydes whose acetals boil above 90° C. may be used. Thus, when tertiary cyclic acetals of formaldehyde (cyclic formals) are being treated according to the process of this invention, primary or secondary alcohols or mercaptans containing less than 9 carbon atoms per molecule may be used to react with the liberated aldehyde, while, when tertiary cyclic acetals of acetaldehyde are treated with primary or secondary alcohols or mercaptans, the latter should contain less than 5 carbon atoms. When secondary (or primary) cyclic formals are treated according to the process of this invention, the compounds capable of reacting with the liberated aldehyde may be primary or secondary alcohols or mercaptans containing up to 15 carbon atoms per molecule, while the similar cyclic acetals may be treated with primary or secondary alcohols or mercaptans containing up to 8 carbon atoms per molecule. When polyhydric alcohols are used as the aldehyde-reacting additive, they should contain no more than 3 carbon atoms per molecule.

The process of the present invention may be illustrated by the following typical reaction equations:

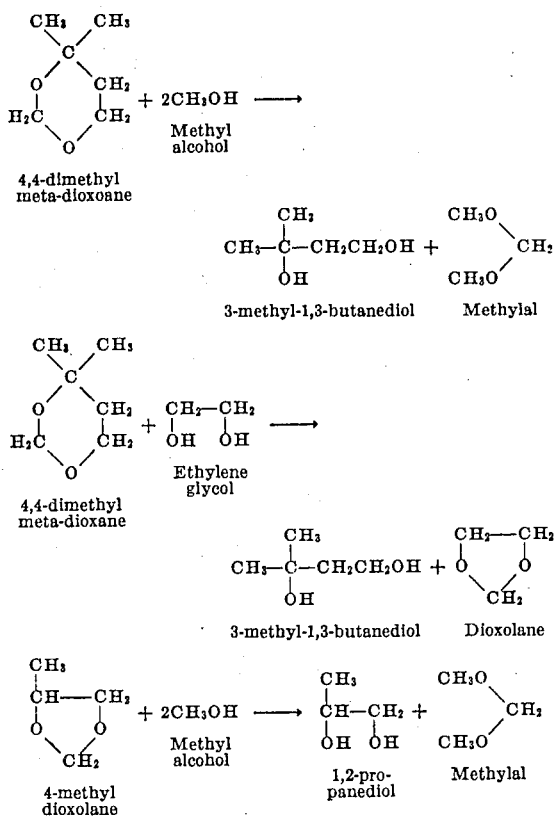

In general, the process of this invention is carried out by refluxing a mixture of cyclic acetal, a compound capable of reacting with the aldehyde liberated in the course of the reaction, and a catalyst under fractionation conditions. The acetal formed by reaction of the liberated aldehyde with the added compound is fractionated off continuously. This process may be carried out at atmospheric pressure when methyl or ethyl alcohol is used as the compound capable of reacting with the liberated aldehyde. When higher-boiling alcohols are used, the pressure on the system must be reduced in order to lower the boiling point of the acetal formed in the reaction and thereby (particularly in the case of tertiary cyclic acetals) enable the maintenance of the reactor temperature below 90° C. It must be remembered, in choosing the compound capable of reacting with the liberated aldehyde, that the resulting acetal must have a boiling point below that of the cyclic acetal undergoing conversion. In some cases, it may be desirable to lower the pressure on the system gradually during the course of the reaction, since the reactor temperature gradually rises due to the removal of the low-boiling acetal and the formation of a high-boiling polyhydric alcohol. When tertiary cyclic acetals are being treated according to the process of this invention, it is desirable to use reduced pressures in order to decrease the reactor temperature and thereby decrease the possibility of dehydration of the glycol, containing a hydroxyl group attached to a tertiary carbon atom, which is formed in said reaction.

The reactions of this invention may be considered as redistribution reactions, since the aldehyde liberated from the initial cyclic acetal immediately reacts with the compound added for this purpose to form a readily distillable acetal. Thus, for example, a meta-dioxane reacts with ethyl alcohol to form a 1,3-glycol and ethylal; a meta-dioxane reacts with ethylene glycol (a 1,2-glycol) to form a 1,3-glycol and dioxolane (the five-membered ring cyclic acetal); and a dioxolane reacts with an alcohol to form a 1,2-glycol and an ordinary (acyclic) acetal.

In general, the reactions of this invention are carried out in the absence of substantial amounts of water. However, it has been found that the presence of small amounts of water in the reaction mixture is not objectionable, since the acetals formed in these reactions are stable in the presence of both the anhydrous and somewhat diluted catalysts under the conditions involved.

In carrying out the reactions of this invention, the reactor temperature will ordinarily be maintained between 50° and 90° C. when tertiary cyclic acetals are being treated, and between 50° C. and 150° C. when secondary (or primary) cyclic acetals are being treated. The reactor temperature can be controlled within the desired ranges by varying the pressure on the reaction system between atmospheric and pressures as low as 2 mm. (mercury pressure). The preferred reactor temperatures and pressures will vary in accordance with the reactants used and the reaction product, and should be chosen accordingly.

Examples of the cyclic acetals which are capable of being converted into polyhydric alcohols by the process of the present invention are as follows:

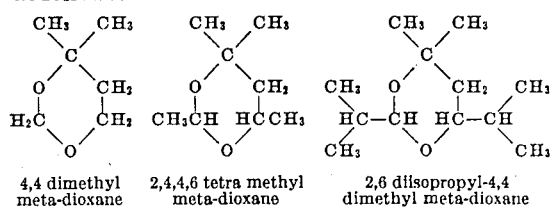

4,4 dimethyl meta-dioxane    2,4,4,6 tetra methyl meta-dioxane    2,6 diisopropyl-4,4 dimethyl meta-dioxane

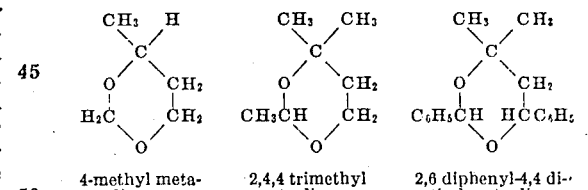

4-methyl meta-dioxane    2,4,4 trimethyl meta-dioxane    2,6 diphenyl-4,4 dimethyl meta-dioxane

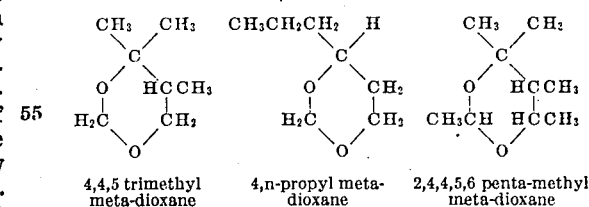

4,4,5 trimethyl meta-dioxane    4,n-propyl meta-dioxane    2,4,4,5,6 penta-methyl meta-dioxane

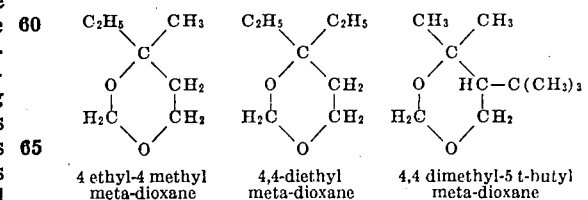

4 ethyl-4 methyl meta-dioxane    4,4-diethyl meta-dioxane    4,4 dimethyl-5 t-butyl meta-dioxane

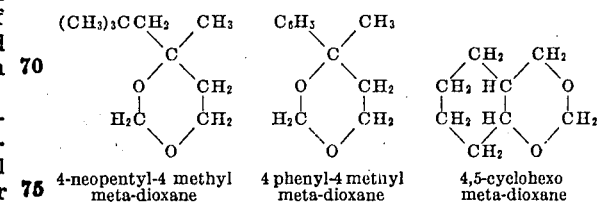

4-neopentyl-4 methyl meta-dioxane    4 phenyl-4 methyl meta-dioxane    4,5-cyclohexo meta-dioxane

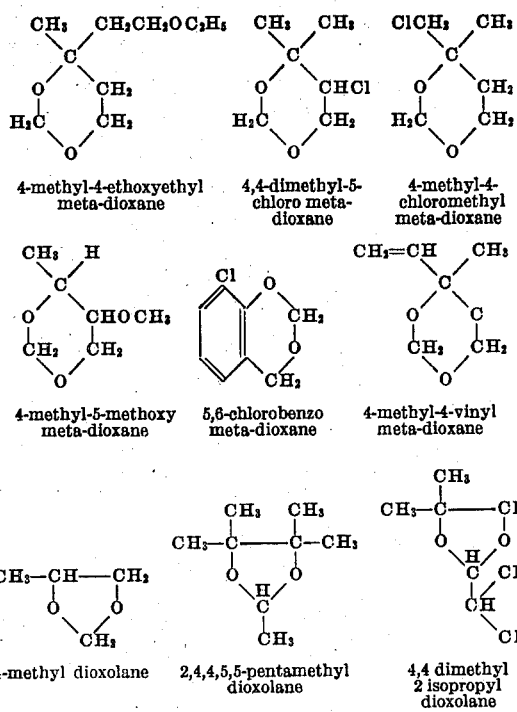

4-methyl-4-ethoxyethyl meta-dioxane  
4,4-dimethyl-5-chloro meta-dioxane  
4-methyl-4-chloromethyl meta-dioxane  
4-methyl-5-methoxy meta-dioxane  
5,6-chlorobenzo meta-dioxane  
4-methyl-4-vinyl meta-dioxane  
4-methyl dioxolane  
2,4,4,5,5-pentamethyl dioxolane  
4,4 dimethyl 2 isopropyl dioxolane Acid-acting substances and halides of elements chosen from the II and IV groups of the periodic table have been found to catalyze the conversion of cyclic acetals into the corresponding polyhydric alcohols. Both mineral and organic acid-acting substances are effective catalysts for these reactions. Among the mineral acid-acting substances are mineral acids, mineral acid-acting salts, and substances which are capable of acting as mineral acids in the presence of moisture. Mineral acid catalysts include HCl, $H_2SO_4$, $HNO_3$, HBr, $H_3PO_4$, $H_2S_2O_7$, $HPO_3$, $H_4P_2O_7$, HF, $HClO_4$, $ClSO_3H$, $FSO_3H$, silicotungstic acid, dihydroxyfluoboric acid, fluosilicic acid, $BF_3$-$H_2O$ complexes and the like. Of the mineral acid-acting salt catalysts there may be mentioned $FeCl_3$, $Fe_2(SO_4)_3$, $NaHSO_4$, $Al_2(SO_4)_3$, $NaH_2PO_4$, etc. Examples of the compounds which act as catalysts in the presence of moisture are $SO_2Cl_2$, $SOCl_2$, $SOBr_2$, $SO_2$, $N_2O_3$, NOCl, $PCl_3$, $PCl_5$, $POCl_3$, and $P_2O_5$.

The organic catalysts include organic acids and organic acid salts which are capable of giving an acid reaction. These include halogenated organic acids, such as chloroacetic acid, aliphatic acids, such as formic, propionic, succinic, and oxalic acids, aliphatic and aromatic sulfonic acids, such as hexyl and toluene sulfonic acids, alkyl and dialkyl sulfates, such as mono- and diethyl sulfate, alkyl phosphates, acid halides, sulfoacetic acids, $BF_3$-alcohol complexes, and the like.

Examples of elements of the II and IV groups of the periodic table whose halides are satisfactory catalysts for the reactions of this invention are zinc, tin, silicon, titanium, and zirconium.

The concentration of the catalyst may vary between 85% and 100%, although the use of the more concentrated or substantially anhydrous catalysts is to be preferred. The catalyst should be used in an amount up to 20% by weight of the cyclic acetal charged to the reactor.

In carrying out the process of the present invention, the alcohol or mercaptan added to react with the aldehyde liberated from the cyclic acetal and the cyclic acetal should be charged to the reactor in a molar ratio of at least 2/1; when glycols are used, the glycol/cyclic acetal molar ratio should be at least 1/1. This molar ratio should be increased when the added compound (such as an alcohol) and the acetal obtained in the course of the reaction form an azeotropic mixture. This is the case, for example, when ethyl alcohol and cyclic formals are used as the reactants. The ethyl alcohol-ethylal azeotrope boils at 69°–71.5° C. at atmospheric pressure. Thus, in the case of this reaction, an excess of ethyl alcohol should be used so that there will be sufficient alcohol present to react with the liberated formaldehyde and to form the binary azeotrope with the ethylal. The ethyl alcohol can be recovered from the azeotropic mixture and be reused in the reaction.

The time required for carrying out the reactions of this invention depends upon the temperature and pressure at which the reactions are carried out, and the nature of the reactants. In general, the reaction may be completed within a period of 1–30 hours.

After the completion of the reaction, the residue is cooled and neutralized with an alkaline material, such as a methyl alcohol solution of potassium hydroxide. Also, especially in cases where boron fluoride catalysts are used, the neutralization may be carried out by passing ammonia into the cooled reaction mixture. Then, in general, the neutralized mixture is filtered, and any alcohol present in the filtrate is separated therefrom by fractionation. The residue from this fractionation is then filtered, and the filtrate is subjected to vacuum distillation, the desired polyhydric alcohol being obtained as an overhead product.

As stated above, the products of these reactions are acetals and glycols. The glycols can be used in anti-freeze mixtures, can be dehydrated to form diolefins (in this case, the glycols need not be isolated from the reaction mixture, but the latter can be heated to obtain the diolefins therefrom directly), can be used in the production of glyptal resins, and as starting materials or intermediates in other chemical processes.

The acyclic acetals may be hydrolyzed under appropriate reaction conditions, e. g., in the presence of mineral acid or dilute $BF_3$-$H_2O$ catalysts, to yield the corresponding aldehydes and alcohols. Or, the acetals may be charged directly into an olefin-aldehyde reactor, where under suitable conditions acting as a source of aldehyde, they may be converted into meta-dioxanes and the saturated alcohol recovered. The cyclic acetals can then be treated according to the process of the present invention to yield polyhydric alcohols, particularly glycols. The equation for a typical olefin-acetal reaction follows:

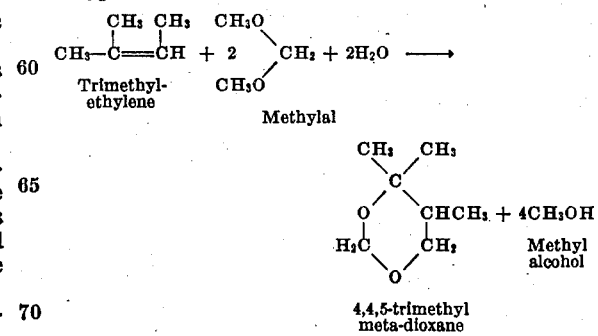

As a variation on the process of this invention, olefins or unsaturated derivatives thereof, such as unsaturated alcohols, ethers, halides, etc., can be condensed with aldehydes in the presence of dilute acid catalysts; following the completion of the condensation reaction the aqueous layer is withdrawn and an alcohol, glycol, or mercaptan can be added to the reaction mixture; the resulting mixture is then refluxed in the presence of additional catalyst, the low-boiling acetal being fractionated off as formed, and the desired glycol remaining in the reactor as a residue. Also, it is within the scope of this invention to prepare a substituted glycol from the corresponding substituted cyclic acetals, which may be substituted by hydroxyl, alkoxy, halo, and similar groups.

As a further variation on the process of this invention, chlorohydrins and dichlorides may be formed by the reaction of cyclic acetals with an alcohol and hydrochloric acid. For example, when the alcohol used in this reaction is methyl alcohol and the cyclic acetal is a cyclic formal, the chloromethyl methyl ether formed by the reaction of methyl alcohol and HCl with the formaldehyde liberated from the cyclic formal is fractionated off continuously, and the desired chlorohydrins and/or dichlorides remain in the reactor as a residue. The hydrochloric acid may be supplied in the form of a gas or a concentrated aqueous solution. Other hydrohalogen acids may be used in place of hydrochloric acid when it is desired to form other halohydrins and dihalides. An equation for a typical reaction of this type follows:

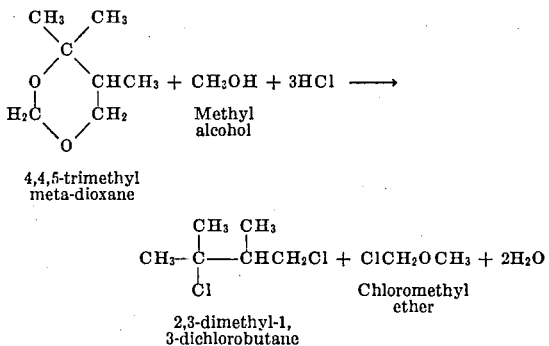

The following examples are given for the purposes of illustrating the invention:

*Example 1*

154 parts of 4-methyl meta-dioxane were placed in a reactor equipped with a fractionating tower. 7½ parts of concentrated sulfuric acid dissolved in 158 parts of methyl alcohol were added and the resulting solution was refluxed at 68 to 81° C. for 8½ hours. Methylal was taken off overhead from 39° to 52½° C. 90 grams of methylal were obtained. The reaction residue was neutralized with a solution of KOH in methyl alcohol. The methyl alcohol was then fractionated off under a tower. The residue was vacuum distilled so that most of the organic material was separated from the salt. The glycol distillate was redistilled under vacuum. 112 parts of 1,3-butanediol were obtained boiling between 95° and 105° C. at 3 mm. pressure.

*Example 2*

18.6 parts of concentrated sulfuric acid were mixed with 320 parts of methyl alcohol with cooling. This mixture was then added to 260 parts of 4,4,5 trimethyl meta-dioxane contained in a reactor equipped with a fractionating tower. The apparatus was connected to a vacuum pump so that the reaction temperature could be controlled by varying the pressure. The mixture was heated at 63 to 64½° C. for 13 hours during which time the pressure was decreased from 760 to 494 mm. 103 parts of methylal were recovered. The reaction mixture was neutralized with a solution of KOH in methyl alcohol. The methyl alcohol was then fractionated off. The residue was ether extracted. The ether then evaporated. The resulting residue was vacuum distilled and the pure 2,3 dimethyl butanediol boiled between 80 to 85° C. at 2 mm. 113 parts of the glycol were obtained.

*Example 3*

269 parts of 4,4,5 trimethyl meta-dioxane were placed in a reactor equipped with a fractionating tower. A solution of 31 parts of fuming stannic chloride in 192 parts of methyl alcohol were added thereto and the solution was refluxed at 70 to 80° C. for 23½ hours. Methylal was taken off overhead as formed. The contents of the reactor were then neutralized with a solution of KOH in methyl alcohol and the neutral solution were filtered under suction. The filtrate was fractionated, methyl alcohol being taken off overhead up to 85° C. The residue was vacuum distilled whereby 66 parts of 2,3 dimethyl 1,3 butanediol were obtained boiling from 85° to 101° C. at 2 mm.

*Example 4*

Boron fluoride gas was passed into 192 parts of methyl alcohol with cooling until 20.5 parts of boron fluoride had been absorbed. This solution was then mixed with 261 parts of 4,4,5 trimethyl meta-dioxane in a reactor equipped with a fractionating tower. The mixture was refluxed for 7¼ hours at 70° to 78° C. and methylal was distilled off overhead at 40 to 46° C. as it was formed. 147 parts of methylal were obtained. Gaseous ammonia was then passed into the residue with cooling. The solution was filtered and the filtrate was fractionated to remove the methyl alcohol. The residue was filtered to remove inorganic salt and the filtrate was vacuum distilled. 60 parts of 2,3 dimethyl 1,3 butanediol were obtained boiling from 70 to 105° C. at 3 mm.

*Example 5*

5½ parts of concentrated sulfuric acid were dissolved in 80 parts of methyl alcohol with cooling. This solution was added to 101 parts of (4,5) cyclohexyl meta-dioxane in a reactor equipped with a fractionating tower. The mixture was refluxed at atmospheric pressure for 3¾ hours. 48 parts of methylal were distilled off overhead. The residue was cooled and neutralized with a solution of KOH in methyl alcohol. The neutral solution was filtered and the methyl alcohol removed from the filtrate under reduced pressure. The residue was vacuum distilled. 35 parts of hydroxy methyl cyclohexanol were obtained boiling from 111 to 114° C. at 3 mm.

*Example 6*

28 parts of concentrated sulfuric acid were dissolved in 143 parts of methyl alcohol with cooling. The resulting solution was added to 225 parts of 4 methyl 4 chloromethyl meta-dioxane in a reactor equipped with a fractionating tower. The mixture was heated for 1¼ hours at 66 to 72° C. The pressure on the apparatus was reduced from time to time to keep the boiling point in this range. The reaction mixture was then neutralized with KOH in methyl alcohol and the neutral solution was filtered under suction.

The filtrate was vacuum distilled. 120 parts of 4 chloro-3-methyl 1,3 butanediol were obtained. The majority of this material boiled between 109 and 111° C. at 4 mm.

Example 7

28 parts of concentrated sulfuric acid were dissolved in 143 parts of methyl alcohol with cooling. This solution was then added to 225 parts of 4,4 dimethyl-5-chloro metadioxane contained in a reactor equipped with a fractionating tower. The mixture was heated and the pressure on the apparatus was gradually decreased so that the boiling point was maintained between 62° and 67.5° C. for 26 hours. The product was neutralized with a solution of KOH in methyl alcohol. The neutral solution was filtered and the methyl alcohol was removed from the filtrate under reduced pressure. The residue was ether extracted, filtered, and finally vacuum distilled. 153 parts of 2-chloro-3-methyl 1,3-butanediol were obtained boiling between 90° and 91.5° C. at 1 mm. This product crystallized on standing. After recrystallization from acetone it melted at 65° C.

Example 8

A reactor equipped with a fractionating column was charged with 116 gms. of 4,4-dimethyl meta-dioxane. To this was added 200 cc. of absolute ethyl alcohol and 4 cc. of concentrated sulfuric acid. This mixture was then refluxed, while a product boiling at 69°-71.5° C. was fractionated off overhead. The reaction was continued in this manner for eight hours. The temperature of the reaction mixture remained at 83.5°-84° C. during this period. 125 cc. (92.6 gms.) of distillate, consisting of an azeotropic mixture of ethylal and ethyl alcohol, were obtained. The residue remaining in the reaction flask was neutralized with sodium hydroxide, the neutralized mixture was filtered, and the filtrate was vacuum-distilled (at a pressure of 6 mm.). The glycol formed in this reaction, 3-methyl-1,3-butanediol, was taken overhead in this distillation.

What is claimed is:

1. An improved process for obtaining large yields of polyhydric alcohol by reaction of cyclic formals with an aliphatic alcohol, which comprises heating the cyclic formals with methyl alcohol in the presence of an acid reacting catalyst and removing methylal formed in the reaction as a vapor.

2. Process according to claim 1 in which the reaction temperature is maintained below 90° C.

3. An improved process for converting olefins of more than 2 carbon atoms to diols, which comprises condensing the olefin with methylal to give a cyclic formal and methyl alcohol, then converting the cyclic formal by means of methyl alcohol and an acid reacting catalyst to a diol and methylal and recycling the latter for reaction with further olefin.

ERVING ARUNDALE.
LOUIS A. MIKESKA.

REFERENCES CITED

The following references are of record in the file of this patent:

UNITED STATES PATENTS

| Number | Name | Date |
|---|---|---|
| 2,071,252 | Corothers | Feb. 16, 1937 |
| 2,078,534 | Groll | Apr. 27, 1937 |